United States Patent [19]

Spevack

[11] 4,102,650

[45] Jul. 25, 1978

[54] PROCESS FEED AND EFFLUENT TREATMENT SYSTEMS

[75] Inventor: Jerome S. Spevack, New Rochelle, N.Y.

[73] Assignee: Deuterium Corporation, White Plains, N.Y.

[21] Appl. No.: 658,059

[22] Filed: Feb. 13, 1976

Related U.S. Application Data

[60] Division of Ser. No. 489,449, Jul. 17, 1974, Pat. No. 3,984,518, which is a continuation of Ser. No. 126,498, Mar. 22, 1971, abandoned.

[51] Int. Cl.² ............................................. B01D 11/04
[52] U.S. Cl. .............................. 23/270.5 W; 261/160
[58] Field of Search ............... 23/270.5 W; 423/580; 261/160, 157

[56] References Cited

U.S. PATENT DOCUMENTS

| | | | |
|---|---|---|---|
| 2,781,862 | 2/1957 | Fussman | 55/56 |
| 2,970,451 | 2/1961 | Ehrlich et al. | 55/56 |
| 3,225,519 | 12/1955 | Stotler | 55/55 |
| 3,348,601 | 10/1967 | Hill | 261/160 |
| 3,954,425 | 5/1976 | Gunther | 55/55 |

*Primary Examiner*—Hiram H. Bernstein
*Attorney, Agent, or Firm*—Hall & Houghton

[57] ABSTRACT

A liquid feed and effluent system to recover dissolved process gas (e.g. $H_2S$) from an effluent process liquid (e.g. water), which liquid may also contain dissolved solid components (e.g. soluble salts); the system heats the feed liquid with heat recovered from the effluent liquid, saturates the so heated feed liquid with process gas, which gas may also contain inert gas components, and separately discharges from the system such inert gas components and effluent liquid from which process gas and heat have been recovered. In the combination the dissolved process gas is preferably recovered from the effluent liquid by flashing at progressively reduced pressures and final vapor stripping thereof at the most reduced pressure.

13 Claims, 2 Drawing Figures

FEED & EFFLUENT a pump P-002 passes the heated sea-water feedwater
PROCESS FEED AND EFFLUENT TREATMENT SYSTEMS

CROSS REFERENCE TO RELATED APPLICATIONS

This application is a division of application Ser. No. 489,449 filed July 17, 1974 (now U.S. Pat. No. 3,984,518 issued Oct. 4, 1976) itself a continuation of application Ser. No. 126,498 filed Mar. 22, 1971 (now abandoned).

BACKGROUND OF THE INVENTION

1. Field of Invention

This application relates to improvements in feed and effluent treatment particularly but not exclusively adapted to use in dual temperature exchange systems utilizing an external water source as one of the process fluids and a partially water soluble gas as another process fluid.

2. Description of the Prior Art

In my prior U.S. Pat. Nos. 2,895,803 issued July 21, 1959 and 3,142,540 issued July 28, 1964 are disclosed a regenerative stripper system for stripping gas (e.g. $H_2S$) from a liquid (e.g. water) with the aid of steam supplied at temperature considerably higher than the temperature at which the liquid became saturated with the gas, followed by a partial recovery of the heat by indirect contact heat exchange with a cold process fluid.

SUMMARY OF THE INVENTION

Objects of the invention are to provide an improved feed and effluent treatment system adapted for improving the recovery of a gas (e.g. $H_2S$) from solution in a liquid (e.g. water) which liquid also contains dissolved nonvolatile components (e.g. the nonvolatile solutes of sea water and other contaminated waters), at low temperatures, and with greater effectiveness than said prior art systems; for conditioning the liquid feed supply for such systems in a simple and effective way; and for producing a distilled liquid by-product essentially free of the solubles of the feed.

DESCRIPTION OF PREFERRED EMBODIMENTS

Figure 1:
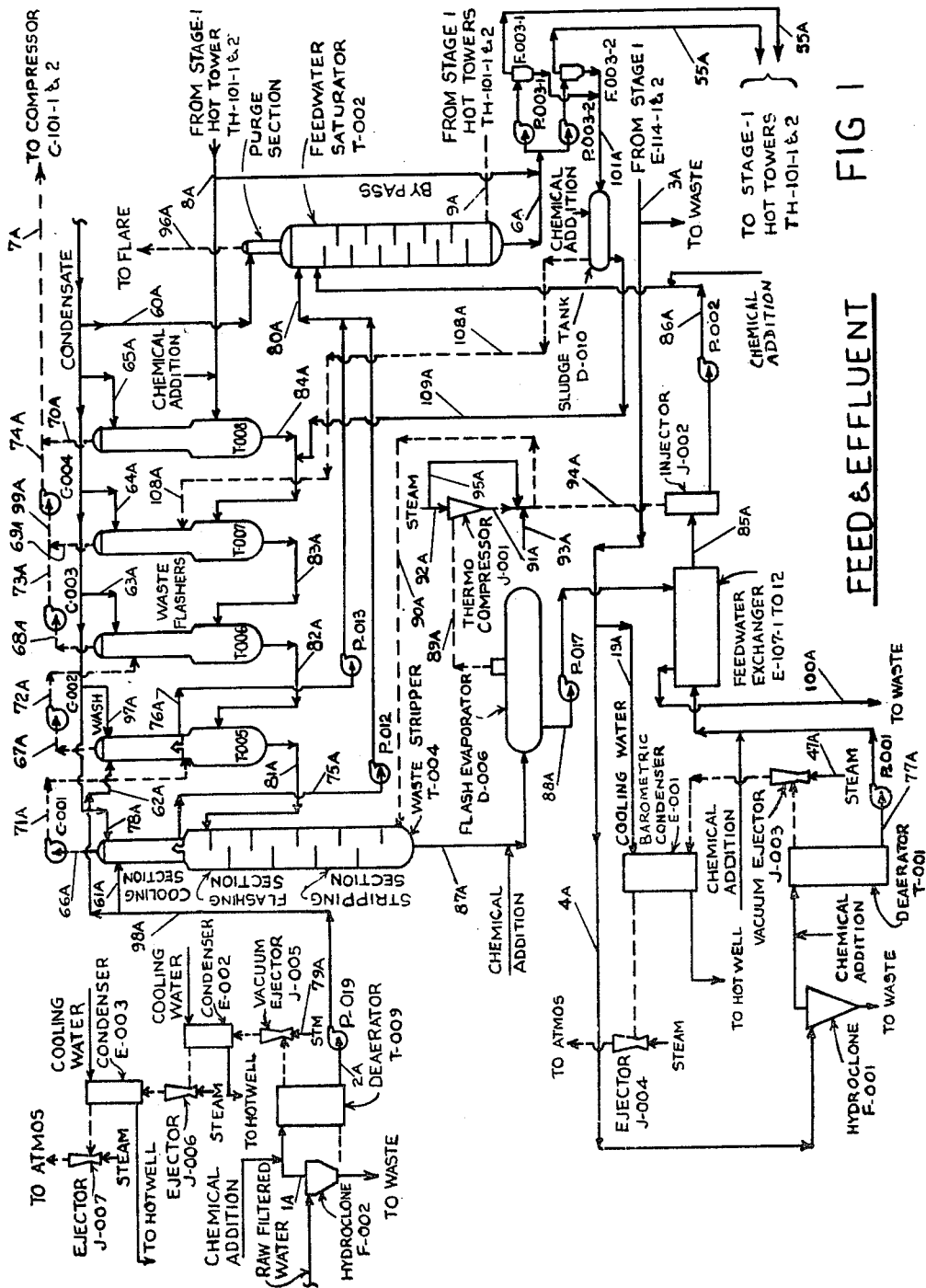
FIG. 1 is a simplified flow diagram of an integrated feed and effluent system for a hydrogen sulfide-water process, according to an embodiment of the invention in which a contaminated water (e.g. sea water) is the feed supply.

The embodiments shown in the drawings are particularly adapted for supplying treated liquid feed to, and treating liquid effluent from, a system processing such liquid and a gas partially soluble therein, such as is disclosed in my concurrently filed application Ser. No. 126,692, (now U.S. Pat. No. 3,860,698 issued Jan. 14, 1975), which is made a part hereof by reference.

By use of these embodiments, applied in the production of heavy water, advantage may be taken of the fact that sea water contains approximately 5% more deuterium content than do river and lake waters.

Referring to FIG. 1 of the accompanying drawings:

The feed water (e.g. sea-water) treating system is integrated in operation with the treatment of the impoverished sea-water discharged from the hot tower for disposal to waste, and provides the heated, $H_2S$ saturated sea-water for deuterium extraction in the dual temperature exchange system. In the illustrated embodiment, the feedwater has initially been utilized for cooling of process fluids in the dual temperature exchange system and is received slightly heated via 3A for treatment.

The feedwater then passes via 4A through a rubber-lined carbon-steel hydroclone cleaner F-001 where solids are removed in the underflow and discharged as waste. The cleaned feedwater then enters an epoxy-lined carbon-steel feed deaerator T-001 where dissolved oxygen and carbon dioxide gases are removed. Gases are withdrawn by the two stage action of two ejectors J-003 and J-004 and a barometric intercondenser E-001. Water from the bottom of the condenser discharges to a hot well.

Oxygen is removed to prevent corrosion of metal surfaces and to prevent sulfur precipitation when the water comes into contact with $H_2S$ used in the process, e.g. by the reaction $2H_2S + O_2 = 2H_2O + 2S$. Insoluble sulfur precipitates can clog the process equipment. Carbon dioxide is removed to prevent the dilution of the $H_2S$ process gas, and also to prevent accelerated corrosion of the equipment as a consequence of the carbonic acid found in aqueous solution thereby. The productivity of the dual temperature system is reduced in proportion to the accumulation of inert or non-exchanging contaminants in the process gas. The cooling water via 19A for the barometric intercondenser E-001 is split from the sea-water flow received via 3A: motive steam for the ejectors is taken off the intermediate pressure steam header.

A pump P-001 withdraws feedwater from the bottom of the deaerator via 77A and passes it to the tube side of the feedwater heat exchangers E-107-. A connection is provided in the passage to the exchangers for chemical addition, e.g. sulfuric acid injection. By this means suitable chemical agents or acid may be added to dissolve scale, e.g. precipitated sulfates or carbonates, if such should form on the heat exchanger tubes from the heating of the sea-water.

In the illustrated embodiment the E-107- heat exchangers are series connected in three parallel trains of four exchangers each. Hot sea-water effluent from the hot tower of the dual temperature system via 8A, after removal of dissolved hydrogen sulfide gas, is passed via 87A, 88A through the shell side of said exchangers whereby the feedwater in the tube side is heated to approximately 250° F. A thermocompressor J-001 supplies steam, which in part has been recovered via 89A from the sea-water effluent by flash evaporator D-006, via 94A, to an injector J-002 for further feedwater heating. The steam is injected into the feedwater at a rate controlled so as to maintain a feedwater temperature of 266° F.

A pump P-002 passes the heated sea-water feedwater stream to the top of the feedwater saturator T-002. The saturator is an Inconel-clad steel tower, designed to saturate approximately 2,000,000 pounds of heated feedwater per hour with $H_2S$ at 325 psia. An additional stream of heated sea-water that has been used in the upper cooling sections of the waste stripper T-004 and waste flasher T-005 for gas cooling, hereinafter described, is also discharged into the top of the saturator T-002. These streams merge and flow downward against a countercurrent flow of $H_2S$ gas, becoming saturated, and constitute the sea-water feed supply to the feed section of the hot tower of the dual temperature system.

The $H_2S$ saturated feedwater is discharged from the bottom of the saturator via 6A and is pumped by the pumps P-003- to Inconel hydroclone cleaners F-003- for removal of heavy metal sulfides and other solids formed by reaction of dissolved minerals in the sea-water under the conditions existing in the saturator. The underflow from these hydroclone cleaners passes via 101A to a sludge tank D-010 for treatment before being removed, e.g. discharged into the effluent stream via 109A. Such treatment may include chemical addition, for example of an acid which reacts with the solids to solublize them and to form $H_2S$ gas for return to the dual temperature process gas system via 108A-7A. The saturated sea-water feedwater passes via 55A from the hydroclones to the top of the feed section of the stage 1 hot towers.

The $H_2S$ delivered via 5A to the saturator T-002 is bled as a purge stream from the humidification section of the dual temperature stage 1 hot towers. Within the saturator, the $H_2S$ reacts with and decomposes dissolved bicarbonate salts, releasing carbon-dioxide gas ($CO_2$) and forming the hydrosulfide ($HS^-$ ion) and to a small degree the sulfide ($S^{--}$ ion) salts in substitution. The $CO_2$ together with other undissolved gases, e.g. nitrogen and hydrogen, are passed through the purge tower section at the top of the saturator. A small stream of relatively pure water, e.g. condensate, is introduced via 60A into the top of the purge tower section to absorb $H_2S$ contained therein and this water flows downward through the purge section and then merges with the feedwater stream in the saturator. The remaining gas stream, which comprises substantially all of the $CO_2$ and inert gas content of the fluids delivered to the saturator T-002, is removed via 96A from the system, e.g. to a flare for discharge to the atmosphere.

Cooling water for the gas cooling sections on top of the waste stripper T-004 and on top of the waste flasher T-005 is taken off via 1A from the sea-water supply line serving the dual temperature system stage 1 dehumidifier process liquid coolers. This water is passed through a hydroclone cleaner F-002 for removal of solids and the underflow is discharged to waste. The cleaned water passes to a deaerator T-009.

Chemical addition, e.g. of sulfuric acid, may be added to this sea-water through a connection upstream of the deaerator. Acid is added to decompose dissolved bicarbonate salts and evolve $CO_2$ before this water enters the waste flasher T-005 and waste stripper T-004, where it comes in contact with $H_2S$. The acid-generated $CO_2$ and other dissolved gases are removed from the water in the deaerator T-009 by the 3-stage action of three ejectors J-005, J-006 and J-007 and two barometric condensers E-002 and E-003, and the deaerated water is then withdrawn by pump P-019 via 98A and is passed via 61A to the waste stripper T-004 and via 62A to the waste flasher T-005.

The effluent stream leaving via 100A is comprised principally of deuterium-depleted sea-water from the dual temperature stage 1 hot towers together with the treated underflow from hydroclone cleaners as above described.

A principle purpose of the effluent treating system is to recover the $H_2S$ which is present at a concentration of about two percent in the sea-water effluent from the dual temperature system. Another is to recover heat from the effluent which is at 266° F when it leaves the stage 1 hot towers. The $H_2S$ is recovered in the waste flashers T-008 to T-005 and the waste stripper T-004 and returned via 7A to the dual temperature system. Heat is recovered in the flash evaporator D-006 where the sea-water effluent after removal of $H_2S$ is partially flashed to steam for use in part via 90A in the waste stripper and in part via 94A to heat the incoming sea-water feed supply, and also in a series of heat exchangers E-107- where the remaining heat of the sea-water effluent before its discharge to waste is used to heat the incoming sea-water feed to the dual temperature system.

$H_2S$ is recovered by passing the hot sea-water effluent discharged from the feed section of the stage 1 hot tower via 8A through a series of four waste flashers T-008, T-007, T-006 and T-005 in that order. These are horizontal pressure vessels made of Inconel-clad steel plate and consist of a flashing section and a gas cooling tower section wherein the released hot $H_2S$ is cooled by countercurrent direct contact with a flow of cool water. As illustrated, three of the waste flashers T-008, T-007, and T-006 have integrally mounted contactor cooling towers. One, T-005, operates in conjunction with a separately mounted contactor tower as is shown by the seal tray at 76A which only allows gas to pass therethrough. The waste flashers operate at successively lower pressures, e.g. 305, 250, 175 and 75 psi, respectively. At each stage of pressure reduction, $H_2S$ is evolved from the effluent. The flashed-off $H_2S$ flows upward to the gas cooler sections where water vapor is condensed and the $H_2S$ is cooled. The flashed $H_2S$ gas is then repressurized, e.g. by compression with gas compressors C-002, C-003 and C-004 to 305 psi, and returned via 7A to compressors C-101-1 & 2 of the dual temmperature stage 1 gas system shown in FIG. 9 (alt), Parts (A) and (B), of the aforesaid U.S. Pat. No. 3,860,698. The gas from waste flasher T-008 is discharged therefrom at the 305 psi pressure of the top of the stage 1 cold tower and therefore does not require further pressure.

After passing through the waste flashers, the sea water effluent is passed to the waste stripper T-004 where the remaining dissolved $H_2S$ is removed in part by a flash to 35 psi and the remainder by action of a countercurrent flow of stripping steam. This waste stripper is an Inconel tower approximately 85 feet high. It consists of an upper cooling section separated as in T-005 and a lower flashing and stripping section. The $H_2S$ is evolved from the effluent in the flashing section and rises through the cooling section, and the effluent liquid proceeds downward to the stripping section where it flows against a countercurrent flow of stripping steam. $H_2S$ concentration in the sea-water effluent leaving the waste stripper is less than one ppm and the $H_2S$ stripped therefrom passes to the waste flasher compressor C-001 for compression and return to stage 1 as aforesaid.

The sea-water effluent from the waste stripper T-004 passes to a flash evaporator D-006 where a part of the water is flashed and evaporated to steam. The flash evaporator is a copper-nickel-alloy vessel approximately 6 feet in diameter and approximately 13 feet long. It operates in conjunction with a thermo compressor J-001 to recover some of the energy present in the effluent. The thermo compressor creates a reduced pressure in the evaporator vessel, converting a portion of the effluent to steam, which is exhausted via 91A for use as stripping steam via 90A to the waste stripper and for injection via 94A to the main sea-water feed stream to the dual temperature system. The hot effluent from the flash evaporator via 88A is pumped by pump P-017 through the shell side of the heat exchanger train E-107- to heat the main sea-water feedwater stream on the tube side therein. This cooled effluent is then discharged via 100A as waste.

The underflow from the sea-water feed hydroclones F-003- is discharged via 101A to a sludge tank D-010 where sulfuric acid is added. The sludge tank is an Inconel pressure vessel. $H_2S$ is evolved in the tank from the reaction of acid with sulfides removed in the hydroclone cleaners.

As shown, the evolved $H_2S$ vapor is passed to the gas cooler tower on the top of the waste flasher T-007 to join the flow of recovered gas to be returned to the dual temperature stage 1, and the discharge from the sludge tank via 109A is mixed with the effluent passing from waste flasher T-008 via 84A. Any excess acid which may be present in the sludge tank discharge continues to react with dissolved sulfides in the sea-water effluent to further evolve $H_2S$ gas which is chemically or otherwise bound and would not otherwise be released in the flashing and stripping operations.

The evolved $H_2S$ gas passes from the waste flashers and the waste stripper to the waste flasher compressors. In the illustrated embodiment, the compressors C-001, C-002, C-003 and C-004 may be driven by a single stream turbine through a common shaft, which together comprises a multi-stage compressor unit for compression of the released $H_2S$ for return to the dual temperature system.

Figure 2:
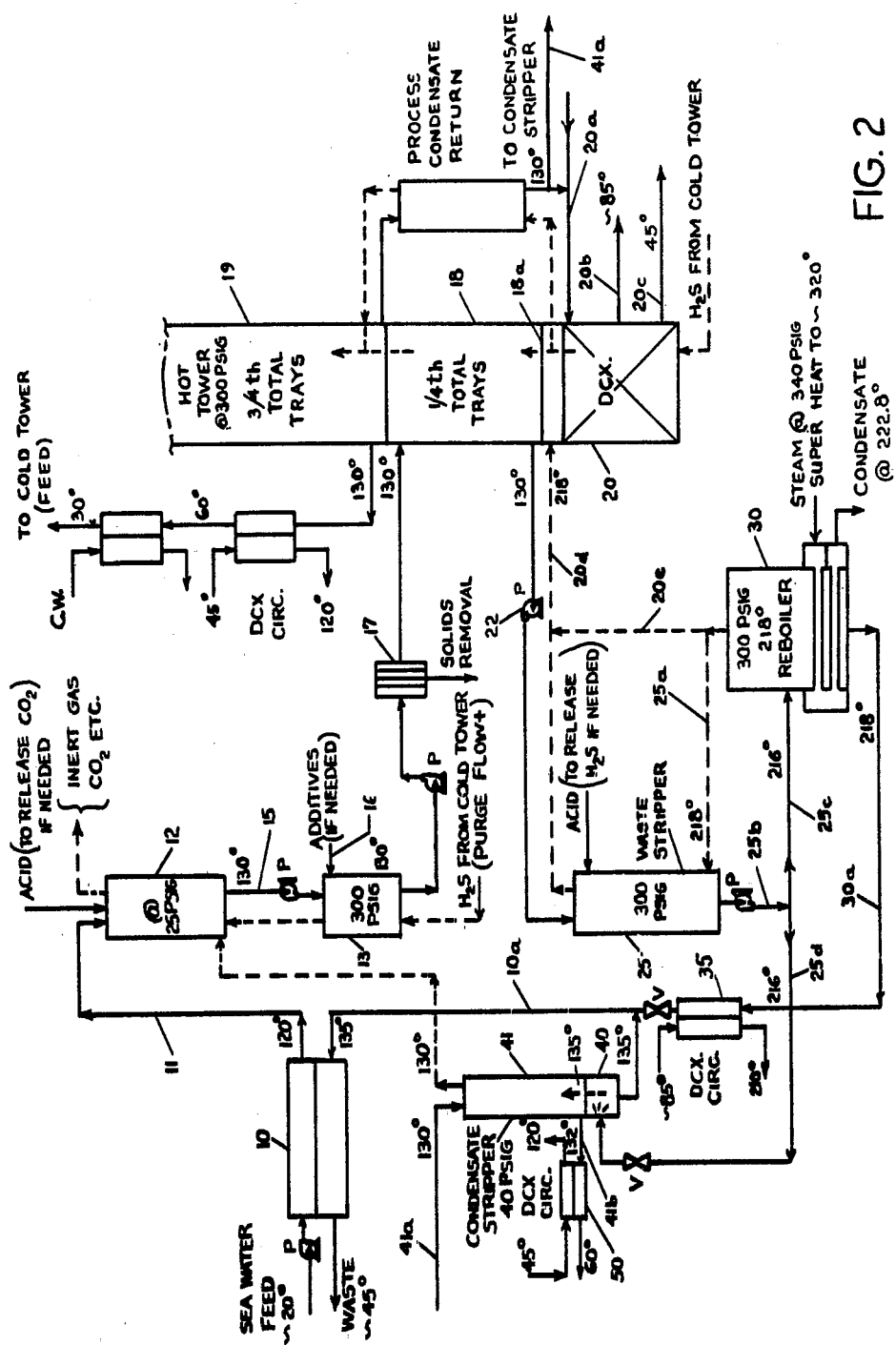
FIG. 2 is a schematic diagram of another embodiment.

Referring now to FIG. 2 of the accompanying drawings:

In this embodiment the cold sea water feed (e.g. at 20° C) is passed through an indirect contact heat exchanger 10 in countercurrent to the treated effluent passing to waste, becoming heated (e.g. to 120° C) while the effluent is cooled (e.g. from 135° to 45° C). The heated sea water via 11 passes to a two stage $H_2S$ saturator and inert gas and dissolved $CO_2$ remover 12, 13 wherein a countercurrent contact with a stream of $H_2S$ the water becomes saturated therewith first at a lower pressure and then at a higher pressure, and the dissolved carbonates therein are converted to hydrosulfides and sulfides, freeing $CO_2$ gas, which is vented together with any inert gas content of the $H_2S$ and/or water streams. In the first stage 12 the water feed is heated at a low pressure (e.g. 25 psig) approaching the temperature of the $H_2S$ gas stream (about 130° C) depending on the quantity of hot gas delivered. In the second stage 13 to which the treated water from the first stage is pumped via 15 the pressure is higher (e.g. 300 psig) and the saturation with the gas at this pressure is accomplished therein. For mineral removal or recovery, etc. the liquid (e.g. sea water) may be treated with additives supplied as via 16 for precipitating dissolved materials which can then be removed as by a filter, decanter or other separator 17, from which the treated liquid saturated with gas at the temperature and pressure of the process feed section 18 (shown as a feed section comprising the lower quarter of the trays section of the hot tower of a dual temperature exchange unit 19 is delivered to said feed water section, as shown.

In this feed section 18 the saturated liquid passes in countercurrent exchange with a circulating stream of gas ($H_2S$) which has been passed through the heater and humidifier 20 where it is heated and humidified and brought to the temperature of the feed section 18. The gas heating in the form shown is accomplished in part by direct contact with a branched circulation of water entering via 20a and exiting at different temperature levels (e.g. 85° and 45° C) via 20b and 20c, augmented by injection of steam via 20d (e.g. at 218° C) sufficient to raise it to the temperature of the feed section 18 and tower 19, (e.g. 130° C). The feed fluid stream leaving the feed section 18 above the seal tray 18a (which allows gas to pass upwardly therethrough but prevents downward flow of feed liquid therethrough) is pumped via 22 to the waste stripper 25 operating at a slightly higher pressure to allow stripped gas ($H_2S$) and steam to return via 20d to the top of the humidifier section 20. Steam is supplied via 25a to the bottom of the stripper 25 passing countercurrent to the $H_2S$ saturated liquid from 22, whereby the water leaving 25 via 25b is substantially free of gas (e.g. $H_2S$). Additional steam as needed is supplied to 20d by 20e from a suitable source such as the boiler 30.

In the form shown a portion of the water stripped of $H_2S$ is passed from 25b via 25c as feed to the boiler 30 wherein it is partially evaporated by an external heat supply. The unevaporated portion via 30a, and liquid via 25d may be merged, and be used in part to heat at least a portion of the cyclic flows via 20c and/or 20b in a heat exchanger 35, and may in part be sent to a flasher 40 operating at reduced pressure where steam is evolved which may be used in stripper 41 to strip $H_2S$ from a separate flow of $H_2S$ saturated condensate formed by the cooling and dehumidification of the hot process gas from 19, about equal to the quantity of steam introduced at 20d. Said condensate entering 41 via 41a at about 130° C and exiting via 41b at about 132° C then passes in countercurrent heat exchange in 50 to heat another portion of said cyclic flows 20b and/or 20c. The remaining liquid from 40 and the cooled liquid from 35 via 10a is passed through the heat exchanger 10, as above described.

While there have been described herein what are at present considered preferred embodiments of the invention, it will be obvious to those skilled in the art that modifications, including changes and omissions and substitutions, may be made without departing from the essence and principle of the invention. It is therefore to be understood that the exemplary embodiments are illustrative and not restrictive of the invention, the scope of which is defined in the appended claims, and that all modifications that come within the meaning and range of equivalency of the claims are intended to be described and included therein.

I claim:

1. Apparatus for treatment of the liquid water feed and effluent of a gas and liquid system in which system flows of hydrogen sulfide gas saturated with water vapor and of liquid water saturated with hydrogen sulfide are contacted at elevated temperature and pressure, said system having a feed liquid inlet for said liquid water feed, an effluent liquid outlet for said liquid effluent, a gas inlet, and a purge gas outlet through which a purge stream of said gas is discharged, said apparatus comprising:

(a) delivery means connected for delivering a stream of said water feed to said feed liquid inlet, and
   (b) means connected in said delivery means upstream of said feed liquid inlet for treating said water feed prior to its introduction into said system, including:

(1) heat transfer means having a heating fluid inlet connected to said effluent liquid outlet, a cooled heating fluid outlet, a liquid water inlet connected in said delivery means to receive said liquid water feed for heating the same, and a liquid water outlet connected in said delivery means to pass heated feed liquid to said feed liquid inlet, for thereby heating said water feed by transferring heat thereto from said effluent as said effluent is cooled, (2) a countercurrent gas and liquid direct contact means, for absorbing into said heated liquid water feed hydrogen sulfide from said purge stream, and having gas inlet and outlet passages and liquid inlet and outlet passages, and having its gas inlet passage connected to receive said purge stream from said purge gas outlet, its liquid outlet passage connected to said feed liquid inlet, and its liquid inlet passage connected to the heating fluid outlet of said heat transfer means, and (3) liquid pressurizing means connected in said delivery means for supplying liquid water feed to said gas and liquid contact means at essentially said elevated pressure, whereby said liquid water feed is heated to approach said elevated temperature and saturated with hydrogen sulfide at essentially said elevated temperature and pressure.

2. Apparatus as claimed in claim 1 in which, when the water feed contains dissolved minerals which become reacted to insoluble sulfides in said countercurrent gas and liquid contact means, said apparatus further comprises:

(c) separating means connected in said delivery means between said liquid outlet passage and said feed liquid inlet, for separating said insoluble sulfides from said feed liquid, and having solids outlet means for the delivery of separated insoluble sulfides therefrom.

3. Apparatus as claimed in claim 1, which further comprises:

(d) reactor means having an inlet connected to said solids outlet means for receiving said insoluble sulfides therefrom, a further inlet for addition of reactant thereto, and separate outlets for gaseous and non-gaseous products of said reaction, and (e) means connected to the gas outlet of said reactor means for delivering said gaseous products therefrom.

4. Apparatus according to claim 3, in which said means (e) is connected between said gas outlet of said reactor means and said gas inlet to said system for delivering said gaseous products to said gas inlet.

5. Apparatus as claimed in claim 3, in which said non-gaseous reaction products are comprised in an aqueous liquid containing hydrogen sulfide gas dissolved therein, said apparatus further comprising:

(f) dissolution means for separating dissolved hydrogen sulfide gas from said aqueous liquid and having gas outlet means and liquid inlet and outlet means with its liquid inlet means connected to said outlet for non-gaseous products, and (g) means connected between said gas outlet means of said dissolution means and said gas inlet to said system for delivering thereto hydrogen sulfide gas from said dissolution means.

6. Apparatus as claimed in claim 3, in which said non-gaseous reaction products are comprised in an aqueous liquid containing hydrogen sulfide gas dissolved therein, said apparatus further comprising:

(f) dissolution means for separating dissolved hydrogen sulfide gas from said aqueous liquid and having gas outlet means and liquid inlet and outlet means with its liquid inlet means connected to said outlet for non-gaseous products and also to said effluent liquid outlet of said system, and (g) means connected between said gas outlet means of said dissolution means and said gas inlet to said system for delivering thereto hydrogen sulfide gas from said dissolution means.

7. Apparatus as claimed in claim 1, which further comprises:

(c) flasher means including means for maintaining therein a pressure less than said elevated pressure, said flasher means having effluent liquid inlet means and gas and liquid outlet means, with its said effluent liquid inlet means connected to said effluent liquid outlet of said system to receive effluent liquid therefrom, and with its said gas outlet means connected to said gas inlet of said gas and liquid contact system.

8. Apparatus as claimed in claim 7, wherein said flasher means comprises a plurality of flash evaporator sections connected in series and maintained at progressively lower pressures.

9. Apparatus as claimed in claim 8, further comprising means connected to the last of said sections for injecting thereinto stripping steam.

10. Apparatus as claimed in claim 7 in which said means (b) for treating said water feed prior to its introduction into said system comprises a plurality of heating stages and said countercurrent gas and liquid contact means of clause (b)(2) constitutes the last of said heating stages.

11. Apparatus as claimed in claim 7 which further comprises gas compressing means having an inlet and an outlet with its inlet connected to the gas outlet means of said flasher means and its outlet connected to said gas inlet to said system.

12. Apparatus for treatment of the liquid water feed and effluent of a gas and liquid system in which system flows of hydrogen sulfide gas saturated with water vapor and of liquid water saturated with hydrogen sulfide are contacted at elevated temperature and pressure, said system having a feed liquid inlet for said liquid water feed, an effluent liquid outlet for said liquid effluent and a gas inlet, said apparatus comprising:

(a) discharge means connected to said effluent liquid outlet for delivering from said system a stream of said liquid effluent, and (b) means connected in said discharge means for treating said liquid effluent after its delivery from said system, including:

(1) at least one vessel having a liquid inlet for said delivered effluent and means for maintaining the same at pressure less than the said elevated pressure and higher than atmospheric pressure for releasing from said liquid effluent therein hydrogen sulfide gas containing water vapor, said vessel having released gas outlet means and liquid outlet means therefrom, and (2) direct contact countercurrent gas cooling means, separated from said vessel, having liquid and gas inlet and outlet means with (i) its gas inlet means connected to said released gas outlet means, (ii) its liquid inlet means connected to a supply of said liquid water feed, and (iii) its liquid outlet means connected to said feed liquid inlet of said system, and (c) gas compressing means connected between the gas outlet of said gas cooling means and said gas inlet to said system for returning cooled released gas to said system.

13. Apparatus as claimed in claim 12, in which said means (b)(1) comprises a plurality of separate vessels in series maintained at progressively lower pressures, and which further comprises:

(d) countercurrent direct contact stripper means maintained at substantially the pressure of the last of said vessels for stripping hydrogen sulfide from the liquid effluent from the last of said vessels by countercurrent contact with a flow of water vapor, and having means connected to the liquid outlet means of the last of said vessels for receiving the liquid effluent therefrom, means for providing said flow of water vapor therein, and means for delivering the stripped hydrogen sulfide to said gas compressing means (c).

* * * * *

UNITED STATES PATENT AND TRADEMARK OFFICE
CERTIFICATE OF CORRECTION

PATENT NO. : 4,102,650
DATED : July 25, 1978
INVENTOR(S) : Jerome S. Spevack

It is certified that error appears in the above-identified patent and that said Letters Patent are hereby corrected as shown below:

Referring to the numbered Columns of the patent:

| | | | |
|---|---|---|---|
| In Column 2, | at line 27, | for "found" | read "formed" |
| " | at line 32, | for "3A: motive" | read "3A. Motive" |
| In Column 3, | at line 14, | for "solublize" | read "solubilize" |
| " | at line 23, | for "carbon-dioxide" | read "carbon dioxide" |
| In Column 4, | at line 35, | for "temmperature" | read "temperature" |
| In Column 5, | at line 29, | for "stream" | read "steam" |
| " | at line 46, | for "gas," | read "gas" |
| " | at line 62, | for "tower" | read "tower 18, 19" |
| " | at line 63, | for "exchange unit 19" | read "hot tower and cold tower exchange unit" |
| In Column 6, | at line 24, | for "30a, and" | read "30a and" |
| In Column 7, | at line 42, | for "claim 1" | read "claim 2" |

Signed and Sealed this

Twenty-fourth Day of July 1979

[SEAL]

Attest:

Attesting Officer

LUTRELLE F. PARKER
Acting Commissioner of Patents and Trademarks